(12) United States Patent
Kumar et al.

(10) Patent No.: US 11,632,422 B2
(45) Date of Patent: *Apr. 18, 2023

(54) AUTOMATED SERVER WORKLOAD MANAGEMENT USING MACHINE LEARNING

(71) Applicant: Capital One Services, LLC, McLean, VA (US)

(72) Inventors: Subodh Kumar, Glen Allen, VA (US); Santosh Bardwaj, Lincolnshire, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/711,936

(22) Filed: Apr. 1, 2022

(65) Prior Publication Data

US 2022/0224752 A1 Jul. 14, 2022

Related U.S. Application Data

(63) Continuation of application No. 16/743,819, filed on Jan. 15, 2020, now Pat. No. 11,330,043, which is a
(Continued)

(51) Int. Cl.
*H04L 67/1008* (2022.01)
*H04L 67/1021* (2022.01)
(Continued)

(52) U.S. Cl.
CPC .......... *H04L 67/1008* (2013.01); *G06F 9/505* (2013.01); *G06F 9/5061* (2013.01);
(Continued)

(58) Field of Classification Search
CPC .... G06F 11/1435; G06F 9/505; G06F 3/0653; H04L 67/1008
See application file for complete search history.

(56) References Cited

U.S. PATENT DOCUMENTS

| | | | |
|---|---|---|---|
| 2011/0016214 A1* | 1/2011 | Jackson | G06F 9/505 709/226 |
| 2012/0057191 A1* | 3/2012 | Gnanasambandam | G06F 3/126 358/1.15 |

(Continued)

*Primary Examiner* — Barbara B Anyan
(74) *Attorney, Agent, or Firm* — Perkins Coie LLP

(57) ABSTRACT

Systems and methods are disclosed for managing workload among server clusters is disclosed. According to certain embodiments, the system may include a memory storing instructions and a processor. The processor may be configured to execute the instructions to determine historical behaviors of the server clusters in processing a workload. The processor may also be configured to execute the instructions to construct cost models for the server clusters based at least in part on the historical behaviors. The cost model is configured to predict a processor utilization demand of a workload. The processor may further be configured to execute the instructions to receive a workload and determine efficiencies of processing the workload by the server clusters based at least in part on at least one of the cost models or an execution plan of the workload.

20 Claims, 5 Drawing Sheets

Related U.S. Application Data continuation of application No. 15/870,262, filed on Jan. 12, 2018, now Pat. No. 10,581,958, which is a continuation of application No. 15/337,486, filed on Oct. 28, 2016, now Pat. No. 10,412,155.

(60) Provisional application No. 62/248,166, filed on Oct. 29, 2015.

(51) Int. Cl.
| | | |
|---|---|---|
| *H04L 41/5009* | (2022.01) | |
| *H04L 41/0896* | (2022.01) | |
| *H04L 67/1023* | (2022.01) | |
| *G06F 11/34* | (2006.01) | |
| *G06F 9/50* | (2006.01) | |
| *G06Q 10/06* | (2023.01) | |
| *H04L 41/16* | (2022.01) | |
| *H04L 41/50* | (2022.01) | |
| *G06F 3/06* | (2006.01) | |
| *G06F 3/12* | (2006.01) | |
| *H04L 47/70* | (2022.01) | |

(52) U.S. Cl.
CPC ........ *G06F 9/5088* (2013.01); *G06F 11/3447* (2013.01); *H04L 41/0896* (2013.01); *H04L 41/5012* (2013.01); *H04L 67/1021* (2013.01); *H04L 67/1023* (2013.01); *G06F 3/0608* (2013.01); *G06F 3/0619* (2013.01); *G06F 3/1211* (2013.01); *G06F 9/5038* (2013.01); *G06F 9/5072* (2013.01); *G06Q 10/06* (2013.01); *H04L 41/16* (2013.01); *H04L 41/5096* (2013.01); *H04L 47/70* (2013.01); *H04L 47/827* (2013.01)

(56) References Cited

U.S. PATENT DOCUMENTS

| | | | | |
|---|---|---|---|---|
| 2012/0179824 | A1* | 7/2012 | Jackson | G06F 9/5072 |
| | | | | 709/226 |
| 2012/0266176 | A1* | 10/2012 | Vojnovic | G06F 9/5038 |
| | | | | 718/104 |
| 2013/0185729 | A1* | 7/2013 | Vasic | G06F 9/5072 |
| | | | | 718/104 |
| 2014/0141744 | A1* | 5/2014 | Miluzzo | H04M 15/61 |
| | | | | 455/406 |
| 2015/0215173 | A1* | 7/2015 | Dutta | G06F 9/5038 |
| | | | | 709/226 |
| 2016/0087909 | A1* | 3/2016 | Chatterjee | G06F 9/5094 |
| | | | | 709/226 |
| 2016/0350146 | A1* | 12/2016 | Udupi | G06F 9/5027 |
| 2017/0068493 | A1* | 3/2017 | Kulkarni | G06F 3/1262 |
| 2017/0317495 | A1* | 11/2017 | Pavlovski | G06Q 10/04 |

* cited by examiner

AUTOMATED SERVER WORKLOAD MANAGEMENT USING MACHINE LEARNING

CROSS-REFERENCE TO RELATED APPLICATIONS

This application is a continuation of U.S. patent application Ser. No. 16/743,819, filed Jan. 15, 2020, which is a continuation of U.S. patent application Ser. No. 15/870,262, filed Jan. 12, 2018, which is a continuation U.S. patent application Ser. No. 15/337,486, filed Oct. 28, 2016, which claims the benefit of priority of U.S. Provisional Application No. 62/248,166, filed Oct. 29, 2015, which applications are incorporated herein in their entirety by reference.

TECHNICAL FIELD

The present disclosure provides an automated system and method for managing workload amongst multiple computers, processors, and/or clusters of computers/processors. In particular, the disclosed system and method address problems related to optimizing computer processing efficiency by, among other things, using machine learning to study the utilization and performance of the computing resources and distributing workload amongst the computing resources based on the study.

BACKGROUND

The "Big Data" environment refers to a computing environment running computationally intensive and data-intensive jobs that cannot be feasibly implemented in a traditional manner on a computing system. Thus, the Big Data environment often employs multiple types and generations of computing systems organized into server clusters, grids, data centers, and clouds. In this highly heterogeneous environment, different workloads compete for available hard resources like central processing unit (CPU) capacities, memories, storage space, input/output (I/O) channels, network bandwidth, and soft resources like available server processes. Workload management is thus essential to ensuring that the use of all resources is optimized and that the workload is run with maximum efficiency.

Traditionally, administrators of the Big Data environment monitor the environment and track any abnormalities. For example, in an environment containing multiple server clusters, the administrators may frequently move workloads from overloaded clusters to lightly-used clusters. Also for example, the administrators may use knowledge acquired over years to identify jobs that are inefficient and take corrective actions, such as terminating the jobs, providing recommendations about how to improve the coding qualities based on observed behaviors of the jobs, etc.

But as the Big Data environment becomes increasingly more complex and ever changing, the administrators face at least three challenges. First, accurate workload management requires analysis of multiple machine and job metrics. Hundreds of metrics and their correlations may be needed to paint a complete picture of workload complexities, software dependencies, resource utilizations, and hardware configurations. It may be impossible for the administrators to monitor these metrics with enough granularity to effectively account for abnormalities. Second, multiple tools are used to access data in the Big Data environment, and the different tools have different behaviors. Because different jobs may be coded using different tools, this makes it very difficult for the administrators to diagnose the coding qualities of the jobs and to give useful recommendations. Third, Big Data systems change behavior when the underlying hardware configurations and capacities change, a continuing event that administrators cannot observe—much less account for—as an observer. For example, if new server clusters are added into the environment or old servers in a cluster are replaced with new ones, the administrators cannot readily adjust their understanding about the hardware resources and thus cannot provide accurate advice.

For the above reasons, the current workload management in the Big Data environment is mainly reactive in nature. Because there is no mechanism to predict how a job will behave in the environment and what the cost to process the job will be, existing systems can only take remedial measures after system anomalies are detected and many hours of computing power are wasted. Moreover, because the skills and experiences of the administrators vary, it is impossible to provide consistent and automated guidance to manage the Big Data environment.

In view of the shortcomings and problems with traditional workload management systems, an improved system and method for server workload management is desired.

SUMMARY

The disclosed embodiments provide methods and systems for automated server workload management using machine learning. In particular, the disclosed systems and methods predict a distributed computing system's efficiency of processing a workload by using machine learning algorithms to study historical behavior of the system. Thus, proactive measures may be taken to manage the workload to prevent system abnormalities. Moreover, the disclosed systems and methods closely keep track of changes to the system configuration and resource arability, and thus can quickly adjust the workload management in a changing environment. Furthermore, the disclosed systems and methods use an automated process to consistently manage workloads. Thus, the disclosed embodiments provide enhancements to server workload management technology, and address problems with traditional server workload management systems. The disclosed systems and methods are implemented using a combination of conventional hardware and software as well as specialized hardware and software, such as a machine constructed and/or programmed specifically for performing functions associated with the disclosed method steps.

Consistent with the present embodiments, a system for managing workload among server clusters is disclosed. The system may include a memory storing instructions and a processor. The processor may be configured to execute the instructions to determine historical behaviors of the server clusters in processing a workload. The processor may also be configured to execute the instructions to construct cost models for the server clusters based at least in part on the historical behaviors. The cost model is configured to predict a processing cost of a workload (e.g., the processor utilization demand in terms of time and resources needed to process the workload). The processor may further be configured to execute the instructions to receive a workload and determine efficiencies of processing the workload by the server clusters based at least in part on at least one of the cost models or an execution plan of the workload.

Consistent with the present embodiments, a method for managing workload among a plurality of server clusters is disclosed. The method may include determining, by a processor, historical behaviors of the server clusters in processing a workload. The method may also include constructing, by the processor, cost models for the server clusters based at least in part on the historical behaviors, the cost models being configured to predict a processing cost of a workload. The method may also include receiving, by the processor, a workload. The method may further include determining, by the processor, efficiencies of processing the workload by the server clusters based at least in part on at least one of the cost model or an execution plan of the workload.

Consistent with other disclosed embodiments, non-transitory computer-readable storage media may store program instructions, which are executed by at least one processor device and perform any of the methods described herein.

The foregoing general description and the following detailed description are exemplary and explanatory only and are not restrictive of the claims.

DETAILED DESCRIPTION

Disclosed embodiments improve the intelligence of server workload management systems by automating the process of distributing workloads among multiple server clusters to achieve high system efficiency. To achieve these improvements in server workload management technology, the disclosed embodiments use machine learning to analyze historical behaviors of the server clusters, construct cost models to predict the efficiencies of the server clusters to process a workload, and assign the workload based on the predictions.

Reference will now be made in detail to exemplary embodiments, examples of which are illustrated in the accompanying drawings and disclosed herein. Wherever convenient, the same reference numbers will be used throughout the drawings to refer to the same or like parts.

Figure 1:
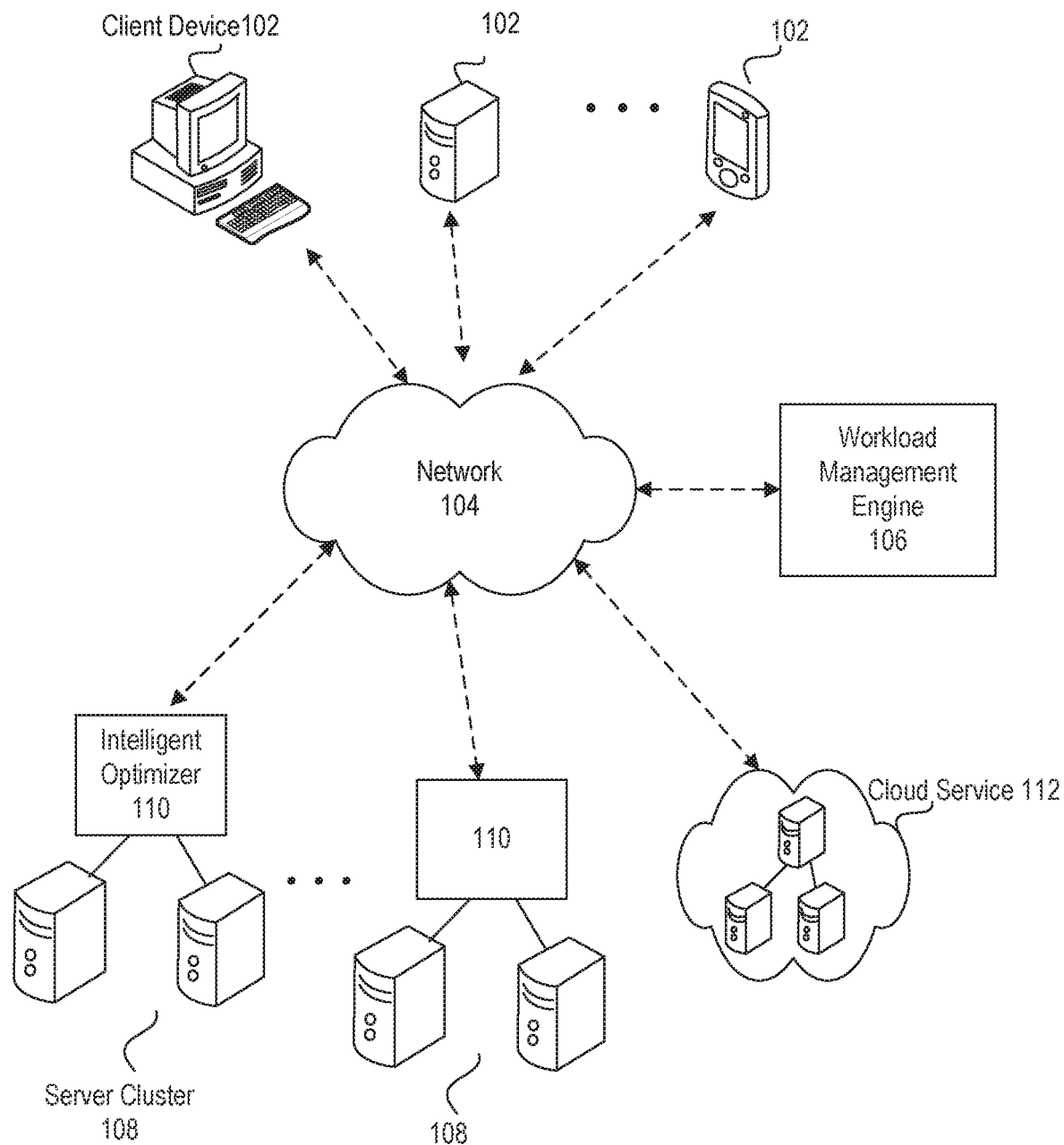
FIG. 1 is a schematic diagram illustrating an exemplary system environment for managing server workload using machine learning, consistent with disclosed embodiments.

FIG. 1 is a schematic diagram of an exemplary system environment for automated workload management using machine learning, consistent with disclosed embodiments. In particular, FIG. 1 shows a diagram of an exemplary system 100, consistent with disclosed embodiments, revealing some technical aspects of the present disclosure for achieving the intended results of the present disclosure. Referring to FIG. 1, system 100 may include a plurality of client devices 102, a network 104, a workload management engine 106, a plurality of server clusters 108, and a cloud service 112. Each of the server clusters 108 may include an intelligent optimizer 110. The components and arrangement of the components included in system 100 may vary. Thus, system 100 may further include other components or devices that perform or assist in the performance of one or more processes consistent with the disclosed embodiments. The components and arrangements shown in FIG. 1 are not intended to limit the disclosed embodiments, as the components used to implement the disclosed processes and features may vary.

As shown in FIG. 1, the client services 102 may be implemented using a variety of different equipment, such as supercomputers, personal computers, servers, mainframes, mobile devices like smart phones and tablets, etc. Client devices 102 may be connected to a network such as network 104. In some embodiments, client devices 102 may be configured to generate information relating to a job. This job may be divisible into a plurality of component tasks. The present disclosure will refer to both the job and the component task generally as a "workload" wherever applicable. The workload may be, for example, a computer-implemented job/task that requires the use of large amounts of data (e.g., thousands or millions of records in a database). A user may input the workload into one of client devices 102 by translating the workload into a programming or notation language (e.g., Java™ (see https://docs.oracle.com/javase/8/docs/technotes/guides/language/), Python™ (see https://www.python.org/), Scala™ (see http://www.scala-lang.org/), R™ (see https://www.r-projectorg/about.html), or the like), using a graphical user interface (e.g., to create a graphical representation of the workload), or using another method. Client devices 102 may send that inputted workload-to workload-management engine 106 for processing.

Network 104, in some embodiments, may comprise one or more interconnected wired or wireless data networks that receive data from one device (e.g., client devices 102) and send it to another device (e.g., workload management engine 106). For example, network 104 may be implemented as the Internet, a wired Wide Area Network (WAN), a wired Local Area Network (LAN), a wireless LAN (e.g., Institute of Electrical and Electronics Engineers (IEEE) 802.11, Bluetooth®, etc.), a wireless WAN (e.g., Worldwide Interoperability for Microwave Access (WiMAX)), or the like. Each component in system 100 may communicate bidirectionally with other system 100 components either through network 104 or through one or more direct communication links (not shown).

Workload management engine 106 may be implemented using a variety of different equipment, such as one or more supercomputers, one or more personal computers, one or more servers, one or more mainframes, one or more mobile devices, or the like. In some embodiments, workload management engine 106 may comprise hardware, software, or firmware modules. Workload management engine 106 may be configured to receive information representing a job from one of client devices 102, parse the job into one or more tasks, schedule the tasks, determine which of server clusters 108 or cloud service 112 should perform each task, send the tasks to at least one of server clusters 108 or cloud service 112, receive task results from server clusters 108 or cloud service 112, aggregate the task results into a job result, and return the job result to client devices 102.

Each server cluster 108 may include a plurality of linked nodes operating collaboratively to run various applications. Each node may be implemented using a variety of different equipment, such as a supercomputer, personal computer, a server, a mainframe, a mobile device, or the like. Server clusters 108 may be located in the same data center or in different physical locations. Multiple server clusters 108 may be formed as a grid to share resources and workloads.

Each server cluster 108 may include an intelligent optimizer 110 implemented using a variety of different equipment, such as one or more supercomputers, one or more personal computers, one or more servers, one or more mainframes, one or more mobile devices, or the like. In some embodiments, workload management engine 106 may comprise hardware, software, or firmware modules. Each intelligent optimizer 110 may be configured to collect and store historical performance data of the associated server cluster 108 in processing various workloads. Intelligent optimizer 110 may run one or more machine learning algorithms to analyze the historical performance data to learn the system behavior of server cluster 108.

The system behavior of each server cluster 108 in processing a workload depends on the capacities of hardware resources and the correlation between the utilizations of these hardware resources. Each intelligent optimizer 110 may run the machine learning algorithms to understand the hardware capacities in each server cluster 108. The processing speed of server cluster 108 depends in part on the hardware capacities. For example, hardware with a larger CPU cache may process a workload faster than hardware with a smaller CPU cache. In some embodiments, intelligent optimizer 110 may analyze the performance data to compute CPU access times, memory access times, network communication times, and storage I/O times.

Each intelligent optimizer 110 may also run the machine learning algorithms to understand the correlation between the utilizations of the hardware resources to process various workloads. For example, a workload usually uses certain CPU cycles for processing certain amount of data stored in a memory or a storage device. If the workload is computationally intensive, a large number of CPU cycles may be used for a modest amount of data. In contrast, if the workload is memory intensive, a small number of CPU cycles may be used but a large amount of data may need to be accessed.

Based on the hardware capacities and the correlation between the utilizations of the hardware resources to process various workloads, intelligent optimizer 110 may further run the machine learning algorithms to construct a cost model for predicting a cost of server cluster 108 in processing a workload (e.g., a processor utilization demand of server cluster 108 to process the workload). The processing cost may be the time and resources consumed by the workload. Using the cost model, intelligent optimizer 110 may compute the time needed by server cluster 108 to process the workload under one or more execution plans, i.e., algorithms. For example, one CPU cycle of a node in server cluster 108 may consume 100 k data, which may in turn require data to be moved from a storage device to a memory. If the data is not local to the node, extra amount of time is required to move the data to the node via a network. By computing the processing costs under multiple execution plans, intelligent optimizer 110 may select an execution plan that has the lowest processing cost.

Figure 2A:
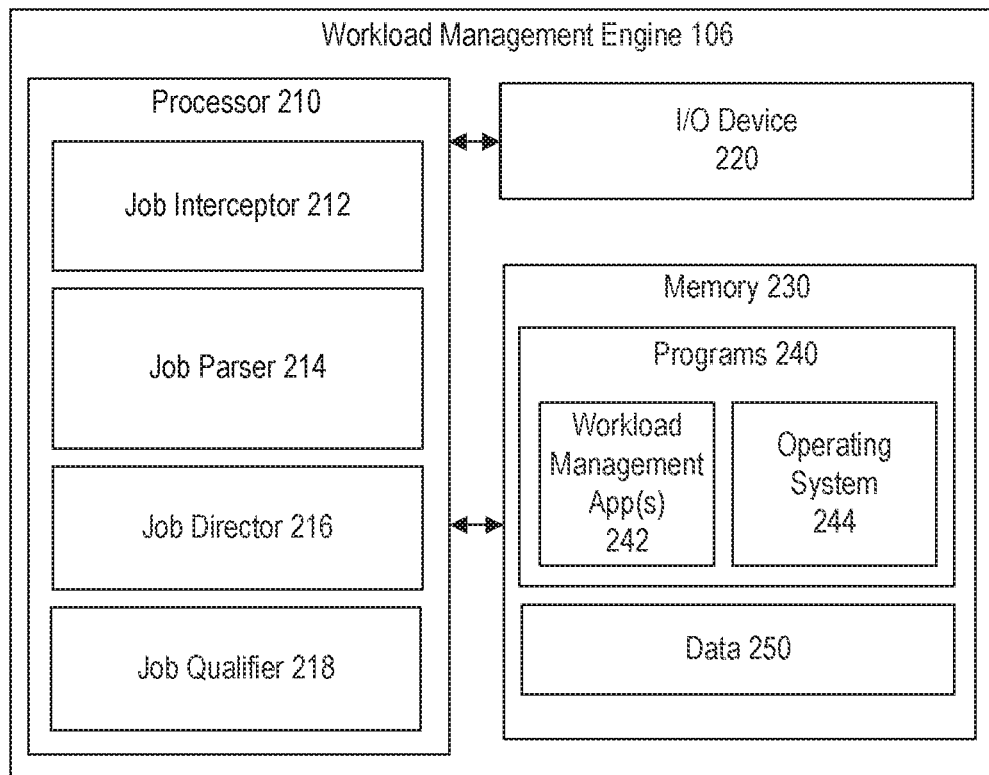
FIG. 2A is a diagram of an exemplary workload management engine configured to perform functions of the disclosed methods, consistent with disclosed embodiments.

FIG. 2A is a diagram of an exemplary workload management engine 106 configured to perform functions consistent with disclosed embodiments. As shown, workload management engine 106 may include one or more processor 210, input/output ("I/O") devices 220, and memory 230 storing programs 240 (including, for example, workload management app(s) 242 and operating system 244) and data 250. Workload management engine 106 may be a single server or may be configured as a distributed computer system including multiple servers or computers that interoperate to perform one or more of the processes and functionalities associated with the disclosed embodiments. In some embodiments, workload management engine 106 is specially configured with hardware and/or software modules for performing functions of disclosed methods. For example, workload management engine 106 may include a job interceptor 212, a job parser 214, a job director 216, and a job qualifier 218. The modules can be implemented as specialized circuitry integrated within processor 210 or in communication with processor 210, and/or specialized software executable by processor 210. Functions of the modules are discussed in further detail with respect to FIG. 4.

Processor 210 may be one or more known or custom processing devices designed to perform functions of the disclosed methods, such as a single core or multiple core processors capable of executing parallel processes simultaneously. For example, processor 210 may be a single core processor configured with virtual processing technologies. In certain embodiments, processor 210 may use logical processors to simultaneously execute and control multiple processes. Processor 210 may implement virtual machine technologies, or other known technologies to provide the ability to execute, control, run, manipulate, store, etc. multiple software processes, applications, programs, etc. In another embodiment, processor 210 may include a multiple-core processor arrangement (e.g., dual core, quad core, etc.) configured to provide parallel processing functionalities to allow workload management engine 106 to execute multiple processes simultaneously. One of ordinary skill in the art would understand that other types of processor arrangements could be implemented that provide for the capabilities disclosed herein.

Workload management engine 106 may also include one or more I/O devices 220 that may comprise one or more interfaces for receiving signals or input from devices and providing signals or output to one or more devices that allow data to be received and/or transmitted by workload management engine 106. For example, workload management engine 106 may include interface components, which may provide interfaces to one or more input devices, such as one or more keyboards, mouse devices, and the like, that enable workload management engine 106 to receive input from a user or administrator (not shown).

Workload management engine 106 may include one or more storage devices configured to store information used by processor 210 (or other components) to perform certain functions related to the disclosed embodiments. In one example, workload management engine 106 may include memory 230 that includes instructions to enable processor 210 to execute one or more applications, such as server applications, an electronic transaction application, an account status application, network communication processes, and any other type of application or software known to be available on computer systems. Alternatively or additionally, the instructions, application programs, etc. may be stored in an internal database or an external storage (not shown) in direct communication with workload management engine 106, such as one or more database or memory accessible over network 104. The internal database and/or external storage may be a volatile or non-volatile, magnetic, semiconductor, tape, optical, removable, non-removable, or other type of storage device or tangible non-transitory) computer-readable medium.

In one embodiment, workload management engine 106 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, workload management engine 106 may include memory 230 that may include one or more programs 240 to perform one or more functions of the disclosed embodiments. Moreover, processor 210 may execute one or more programs located remotely from system 100. For example, workload management engine 106 may access one or more remote programs, that, when executed, perform functions related to disclosed embodiments.

Programs 240 stored in memory 230 and executed by processor(s) 210 may include one or more workload management app(s) 242 and operating system 244. Workload management app(s) 242 may be configured to cause processor(s) 210 to execute one or more processes related to intercepting a workload, determining the importance of the workload, parsing the workload, querying the cost of processing the workload in each server cluster 108, and directing the workload to a selected server cluster 108.

Data 250 may include metadata describing the running status of each server cluster 108. Such metadata may indicate each cluster's file system, data storage locations, current resource availability, historical usage pattern, etc.

Memory 230 may include one or more memory devices that store data and instructions used to perform one or more features of the disclosed embodiments. Memory 230 may also include any combination of one or more relational and/or non-relational databases controlled by memory controller devices (e.g., server(s), etc.) or software, such as document management systems, Microsoft® Structured Query Language (SQL) databases (see https://www.microsoft.com/en-us/cloud-platform/sql-server), Share Point® databases (see https://products.office.com/en-us/sharepoint/collaboration). Oracle® databases (see https://www.oracle.com/database/index.html), or other relational databases, or non-relational databases such as key-value stores or non SQL (NoSQL) databases such as Apache™ HBase™ (Hadoop® Database, see https://hbase.apache.org/). In some embodiments, memory 230 may comprise an associative array architecture, such as a key-value storage, for storing and rapidly retrieving large amounts of information about server cluster 108.

Workload management engine 106 may also be communicatively connected to one or more remote memory devices (e.g., remote databases (not shown)) through network 104 or a different network. The remote memory devices may be configured to store information and may be accessed and/or managed by workload management engine 106. By way of example, the remote memory devices may be document management systems, Microsoft® SQL database, Share Point® databases, Oracle® databases, or other relational databases. Systems and methods consistent with disclosed embodiments, however, are not limited to separate databases or even to the use of a database.

Figure 2B:
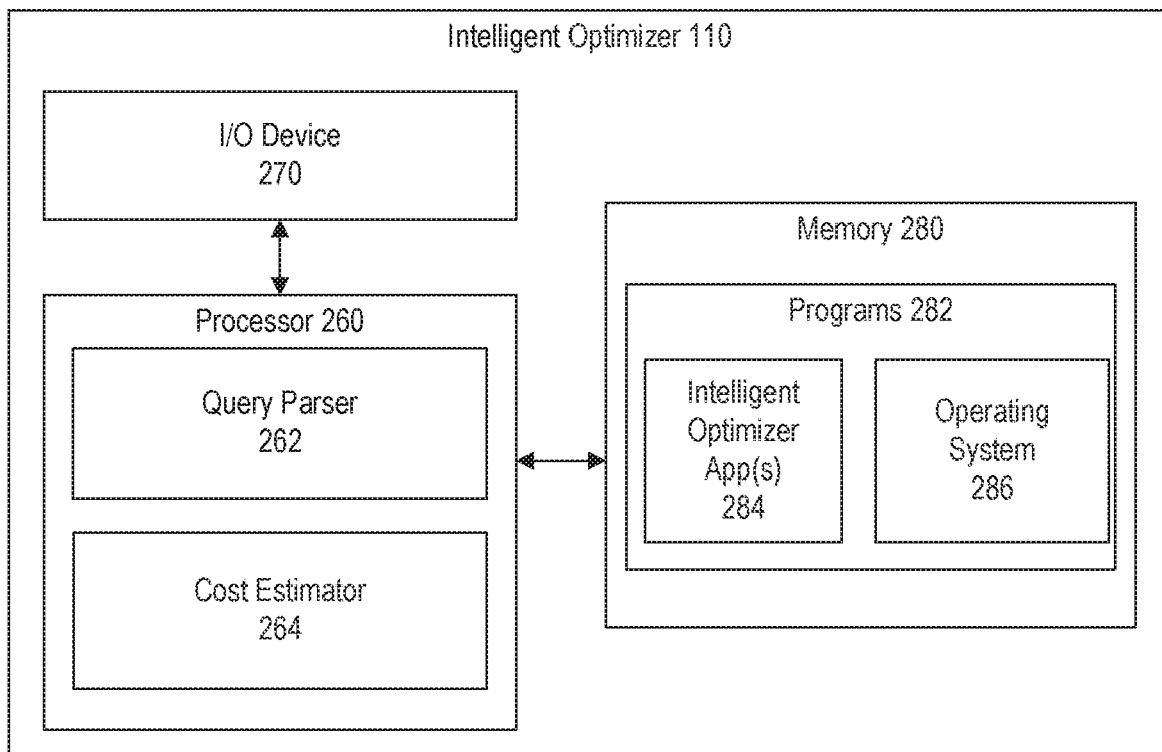
FIG. 2B is a diagram of an exemplary intelligent optimizer configured to perform functions of the disclosed methods, consistent with disclosed embodiments.

FIG. 2B is a diagram of an exemplary intelligent optimizer 110 configured to perform functions consistent with disclosed embodiments. As shown, intelligent optimizer 110 may include one or more processor 260, I/O devices 270, and memory 280 storing data and programs 282 (including, for example, intelligent optimizer app(s) 284 and operating system 286). Intelligent optimizer 110 may be a single server or may be configured as a distributed computer system including multiple servers or computers that interoperate to perform one or more of the processes and functionalities associated with the disclosed embodiments. In some embodiments, intelligent optimizer 110 is specially configured with hardware and/or software modules for performing functions of disclosed methods. For example, intelligent optimizer 110 may include a query parser 262 and a cost estimator 264. The modules can be implemented as specialized circuitry integrated within processor 260 or in communication with processor 260, and/or specialized software executable by processor 260. Functions of the modules are discussed in further detail with respect to FIGS. 3 and 4.

Processor 260 may be one or more known or custom processing devices designed to perform functions of the disclosed methods, such as a single core or multiple core processors capable of executing parallel processes simultaneously, similar to processor 210.

Intelligent optimizer 110 may also include one or more I/O devices 270 that may comprise one or more interfaces for receiving signals or input from devices and providing signals or output to one or more devices that allow data to be received and/or transmitted by intelligent optimizer 110. For example, intelligent optimizer 110 may include interface components, which may provide interfaces to one or more input devices, such as one or more keyboards, mouse devices, and the like, that enable intelligent optimizer 110 to receive input from a user or administrator (not shown).

Intelligent optimizer 110 may include one or more storage devices configured to store information used by processor 260 (or other components) to perform certain functions related to the disclosed embodiments. In one example, intelligent optimizer 110 may include memory 280 that includes instructions to enable processor 260 to execute one or more applications, such as server applications, an electronic transaction application, an account status application, network communication processes, and any other type of application or software known to be available on computer systems. Alternatively or additionally, the instructions, application programs, etc. may be stored in an internal database or external storage (not shown) in direct communication with intelligent optimizer 110, such as one or more database or memory accessible over network 110. The internal database and external storage may be a volatile or non-volatile, magnetic, semiconductor, tape, optical, removable, non-removable, or other type of storage device or tangible (i.e., non-transitory) computer-readable medium.

In one embodiment, intelligent optimizer 110 may include memory 280 that includes instructions that, when executed by processor 260, perform one or more processes consistent with the functionalities disclosed herein. Methods, systems, and articles of manufacture consistent with disclosed embodiments are not limited to separate programs or computers configured to perform dedicated tasks. For example, intelligent optimizer 110 may include memory 280 that may include one or more programs 282 to perform one or more functions of the disclosed embodiments. Moreover, processor 260 may execute one or more programs located remotely from system 100. For example, intelligent optimizer 110 may access one or more remote programs, that, when executed, perform functions related to disclosed embodiments.

Programs 282 stored in memory 280 and executed by processor(s) 260 may include one or more intelligent optimizer app(s) 284 and operating system 286. Server app(s) 284 may include one or more machine learning applications that cause processor(s) 260 to execute one or more processes related to analyzing the hardware capacities and correlations between the utilizations of hardware resources, constructing a cost model for predicting the efficiency of processing a workload, and computing the processing costs (e.g., the processor utilization demands in terms of time and resources needed to process workloads) under different execution plans of the workload.

Memory 280 may include one or more memory devices that store data and instructions used to perform one or more features of the disclosed embodiments. Memory 280 may also include any combination of one or more relational and/or non-relational databases controlled by memory controller devices (e.g., server(s), etc.) or software, such as document management systems, Microsoft® SOL databases, Share Point® databases, Oracle® databases, or other relational databases, or non-relational databases such as key-value stores or NoSQL databases such as Apache™ HBase™. In some embodiments, memory 280 and/or database 292 may comprise an associative array architecture, such as a key-value storage, for storing and rapidly retrieving large amounts of information.

Intelligent optimizer 110 may also be communicatively connected to one or more remote memory devices (e.g., remote databases (not shown)) through network 104 or a different network. The remote memory devices may be configured to store information and may be accessed and/or managed by intelligent optimizer 110. By way of example, the remote memory devices may be document management systems, Microsoft® SQL database, SharePoint® databases, Oracle® databases, or other relational databases. Systems and methods consistent with disclosed embodiments, however, are not limited to separate databases or even to the use of a database.

Figure 3:
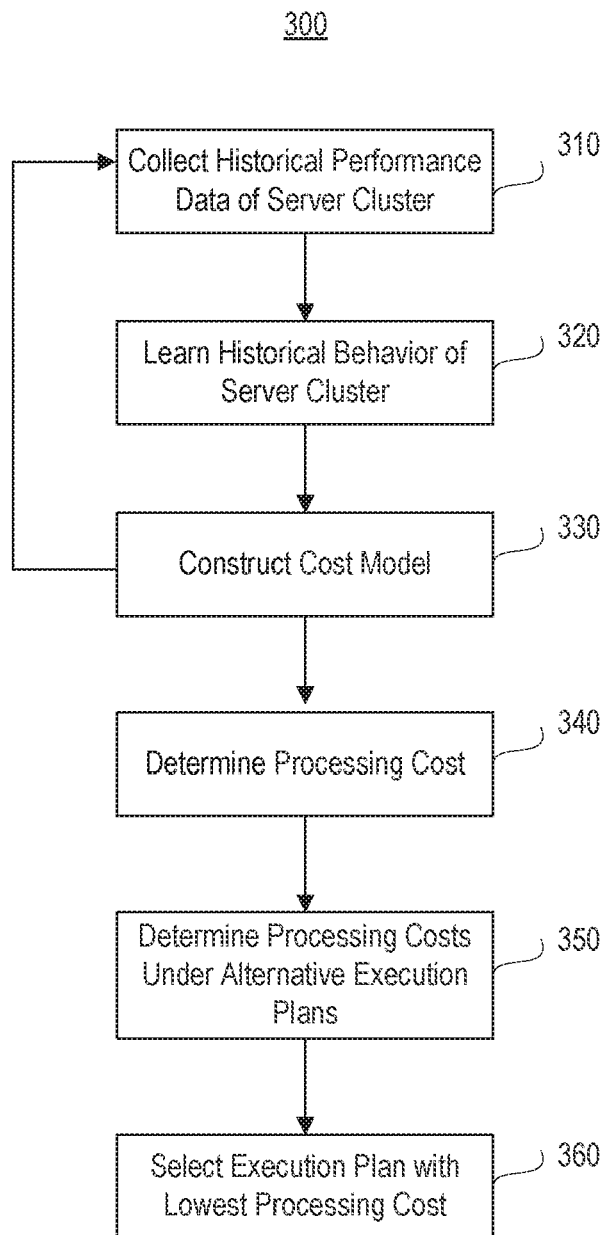
FIG. 3 is a flowchart of an exemplary process for predicting a processing cost of a workload, consistent with disclosed embodiments.

FIG. 3 is a flowchart of a process 300 for predicting a cost of processing a workload by a server cluster 108, consistent with disclosed embodiments. For example, processor 260 of server cluster 108 may perform some or all steps of process 300 via the specialized hardware and/or software configured to perform functions related to process 300. It is to be understood, however, that in some embodiments another device may perform one or more steps of process 300, such as an administrative server or controller (not shown in figures). In other embodiments, multiple devices may perform steps of process 300 in a distributed-computing system.

Process 300 may begin in step 310, in which intelligent optimizer 110 collects historical performance data of associated server cluster 108 in processing a workload. Intelligent optimizer 110 may store the collected performance data in memory 280. The performance data may include multiple machine and job metrics that are determined to be relevant to the prediction of system efficiency.

In step 320, intelligent optimizer 110 may use one or more machine learning algorithms to analyze the historical performance data and to learn historical behavior of server cluster 108 in processing workloads. Intelligent optimizer 110 may determine the composition of hardware resources in server cluster 108 and the capacity of each hardware resource. For example, intelligent optimizer 110 may determine the size of the CPU cache, the amount of data consumed by each CPU cycle, the CPU access times, the memory access times, the network communication times, disk I/O times, etc. Intelligent optimizer 110 may also identify the correlation between utilizations of the various hardware resources to process a workload. Such correlation may depend on the workload's execution plan and the available hardware resources. For example, intelligent optimizer 110 may identify the correlations between the percentage of CPU usage and the amount of data needed to be shuffled from a memory or storage device.

In step 330, intelligent optimizer 110 may use the machine learning algorithms to construct a cost model for predicting the time and resources consumed by a workload. Intelligent optimizer 110 may construct the cost model based at least on the hardware capacities and correlations of utilizations determined in step 320. The machine learning algorithms may be any algorithm known in the art, such as the k-nearest neighbor algorithm, the linear regression algorithm, the decision table/tree algorithm, the artificial neural network (ANN), the support vector machine algorithm, time series method, etc. In exemplary embodiments, steps 310-330 may be routinely repeated so that intelligent optimizer 110 may continuously learn the system behavior and refine the cost model.

In step 340, intelligent optimizer 110 may determine a cost of processing a workload by server cluster 108 based on the cost model, the execution plan of the workload, the current resource availability in server cluster 108.

In step 350, intelligent optimizer 110 may determine costs of processing the workload by server cluster 108 under one or more alternative execution plans. Because the current resource availability usually cannot be changed, intelligent optimizer 110 may provide the alternative execution plans to determine whether the cost of processing the workload can be lowered.

In step 360, intelligent optimizer 110 may select the execution plan that has the lowest processing cost (e.g., processor utilization demand). The selected execution plan may be later used by server cluster 108 to process the workload.

Figure 4:
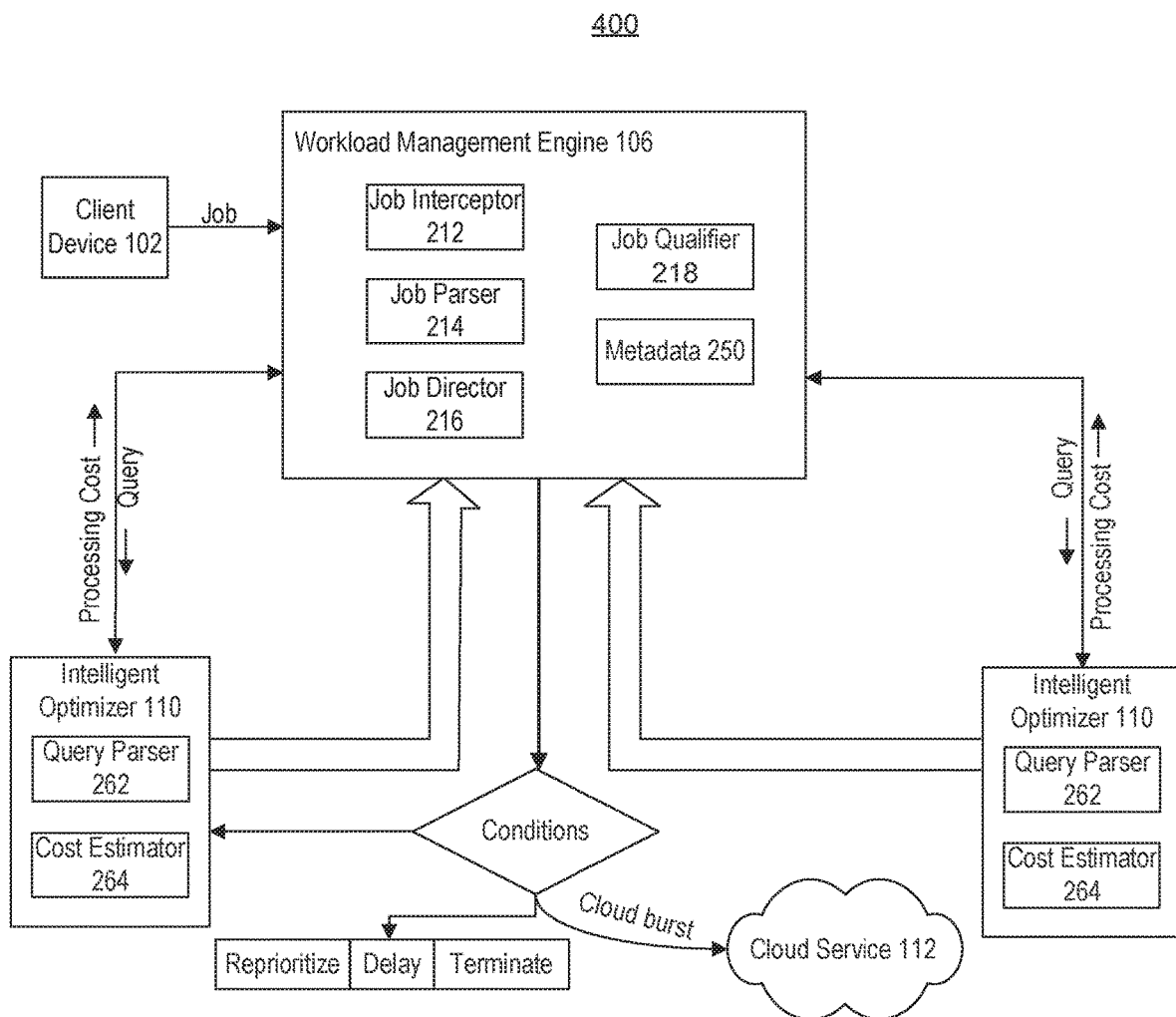
FIG. 4 is a flowchart of an exemplary server workload management process, consistent with disclosed embodiments.

FIG. 4 is a schematic diagram illustrating an exemplary automated server workload management process 400, consistent with disclosed embodiments. For example, process 400 may be performed primarily by a client device 102, workload management engine 106, server clusters 108, intelligent optimizers 110, and/or cloud service 112.

Referring to FIG. 4, process 400 starts when a client device 102 submits a job to be processed by one or more of server clusters 108 and cloud service 112. Workload management engine 106 may include a job interceptor 212 configured to intercept the job at an abstraction layer. Work management engine 106 may also include a job parser 214 configured to parse the intercepted job into one or more component tasks. Workload management engine 106 may further store metadata 250 of each server cluster 108. Metadata 250 may include storage locations of data in each server cluster 108, current resource availability in each server cluster 108, etc. Intelligent optimizer 110 may constantly send real-time metadata of the associated server cluster 108 to workload management engine 106 so that metadata 250 may be updated. Based on metadata 250, workload management engine 106 may determine whether a server cluster 108 is able to process the job/task, i.e., the workload. For example, if metadata 250 indicates that a server cluster is currently saturated or does not store any data required by the workload, workload management engine 106 may determine that the server cluster is not able to process the workload.

Thus, workload management engine 106 may determine one or more candidate server clusters 108 that can process the workload and send queries to intelligent optimizer 110 of each candidate server cluster 108 for evaluating the processing cost (e.g., processor utilization demand). The query may include the execution plan of the workload. Intelligent optimizer 110 may include a workload query parser 262 configured to further parse the workload into smaller components for evaluating the processing cost. Moreover, intelligent optimizer 110 may include a cost estimator 264 configured to compute the processing cost for the workload based on a cost model and the workload's execution plan. Cost estimator 264 may also compute processing costs for the workload under alternative execution plans and select the lowest processing cost. Intelligent optimizer 110 may return the processing cost to workload management engine 106 for further processing.

Workload management engine 106 may include a job director 216 configured to distribute the workload based on one or more predetermined conditions. For example, job director 216 may direct the workload to a server cluster 108 that has the lowest processing cost for the workload among all the available server clusters 108. If there is no server cluster 108 available for running the workload with an acceptable processing cost, job director 216 may change the priority of the workload to minimize its impact on other workloads, defer the workload for a later time based on historical usage pattern of server clusters 108, and/or reject the workload and provide reasons for the rejection.

In one embodiment, workload management engine 106 may include a job qualifier 218 configured to determine an importance level of the workload. For example, the property information of the workload may indicate that the workload has a high business value. Alternatively, workload management engine 106 may receive a user input indicating that the workload is urgent. In these situations, job director 216 may direct the workload to a suitable server cluster 108 for immediate processing. If the workload has a high importance level but there is no server cluster 108 available for running the workload, job director 216 may direct the workload to cloud service 112 for processing.

As described above, in one embodiment, workload management engine 106 may parse a job into multiple component tasks and distribute the tasks to different server clusters 108 and cloud service 112. Workload management engine 106 may include an aggregator (not show) configured to intercept the processing result of each server cluster 108 and cloud service 112 and aggregate the processing results into a final result.

Descriptions of the disclosed embodiments are not exhaustive and are not limited to the precise forms or embodiments disclosed. Modifications and adaptations of the embodiments will be apparent from consideration of the specification and practice of the disclosed embodiments. For example, the described implementations include hardware, firmware, and software, but systems and methods consistent with the present disclosure can be implemented as hardware alone. Additionally, the disclosed embodiments are not limited to the examples discussed herein.

Computer programs based on the written description and methods of this specification are within the skill of a software developer. The various programs or program modules can be created using a variety of programming techniques. For example, program sections or program modules can be designed in or by means of Java™, C, assembly language, or any such programming languages. One or more of such software sections or modules can be integrated into a computer system, non-transitory computer-readable media, or existing communications software.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for managing workloads among server clusters, the system comprising:
   a memory unit storing instructions; and
   one or more processors configured to execute the instructions to perform operations comprising:
      receiving a workload to be processed by a plurality of server clusters;
      receiving from the plurality of server clusters, metadata indicating whether each server cluster of the plurality of server clusters is able to process one or more portions of the workload;
      determining, based on the metadata, a plurality of candidate server clusters able to process the one or more portions of the workload;
      determining a corresponding processing cost for each candidate server cluster of the plurality of candidate server clusters;
      parsing the workload into a plurality of component tasks;
      distributing the plurality of component tasks to a selected set of the plurality of candidate server clusters, wherein the selected set is determined based on each corresponding processing cost; and
      receiving a processing result from each of the selected set of the plurality of candidate server clusters.

2. The system of claim 1, wherein determining each corresponding processing cost for each candidate server cluster comprises sending a query to each of the plurality of candidate server clusters instructing each candidate server cluster to determine each corresponding processing cost.

3. The system of claim 2, wherein sending the query comprises sending a set of instructions to each of the plurality of candidate server clusters to evaluate the corresponding processing cost for one or more component tasks of the plurality of component tasks.

4. The system of claim 2, wherein the operations further comprise aggregating each received processing results into a final result.

5. The system of claim 1, wherein each server cluster comprises an intelligent optimizer and a plurality of linked nodes operating collaboratively.

6. The system of claim 1, wherein each received processing cost is a lowest processing cost computed from among alternative plans for executing the workload on a respective server cluster.

7. The system of claim 1, wherein at least one cost model is based on at least one of historical behavior of a respective candidate server cluster, a composition of hardware resources of the respective candidate server cluster, and a capacity of each respective hardware resource.

8. The system of claim 1, the operations further comprising:
   receiving updated metadata for one of the server clusters; and
   updating the metadata with the updated metadata.

9. The system of claim 1, the operations further comprising determining an importance level of the workload, wherein distributing the workload to a selected server cluster is further based on the importance level of the workload.

10. The system of claim 1, the operations further comprising distributing, by the one or more processors, the workload to a cloud service.

11. A method for managing workloads among server clusters, the method comprising:
   receiving a workload to be processed by a plurality of server clusters;
   receiving from the plurality of server clusters, metadata indicating whether each server cluster of the plurality of server clusters is able to process one or more portions of the workload;
   determining, based on the metadata, a plurality of candidate server clusters able to process the one or more portions of the workload;
   determining a corresponding processing cost for each candidate server cluster of the plurality of candidate server clusters;
   parsing the workload into a plurality of component tasks;
   distributing the plurality of component tasks to a selected set of the plurality of candidate server clusters, wherein the selected set is determined based on each corresponding processing cost; and
   receiving a processing result from each of the selected set of the plurality of candidate server clusters.

12. The method of claim 11, further comprising intercepting the workload at an abstraction layer.

13. The method of claim 11, wherein each query includes an execution plan of the workload.

14. The method of claim 11, further comprising at least one of:
   changing a priority of the workload;
   deferring the workload for processing at a later time; or
   rejecting the workload.

15. The method of claim 11, wherein the metadata comprises storage locations of data in each server cluster and a current resource availability of each server cluster.

16. A non-transitory computer readable medium having stored instructions, which when executed, cause one or more processors to perform operations for managing workloads among server clusters comprising:
   receiving a workload to be processed by a plurality of server clusters;
   receiving from the plurality of server clusters, metadata indicating whether each server cluster of the plurality of server clusters is able to process one or more portions of the workload;
   determining, based on the metadata, a plurality of candidate server clusters able to process the one or more portions of the workload;
   determining a corresponding processing cost for each candidate server cluster of the plurality of candidate server clusters;
   parsing the workload into a plurality of component tasks;
   distributing the plurality of component tasks to a selected set of the plurality of candidate server clusters, wherein the selected set is determined based on each corresponding processing cost; and
   receiving a processing result from each of the selected set of the plurality of candidate server clusters.

17. The non-transitory computer readable medium of claim 16, wherein the instructions for determining each corresponding processing cost for each candidate server cluster further cause the one or more processors to send a query to each of the plurality of candidate server clusters instructing each candidate server cluster to determine each corresponding processing cost.

18. The non-transitory computer readable medium of claim 17, wherein the instructions for sending the query further cause the one or more processors to send a set of instructions to each of the plurality of candidate server clusters to evaluate the corresponding processing cost for one or more component tasks of the plurality of component tasks.

19. The non-transitory computer readable medium of claim 17, wherein the operations further cause the one or more processors to aggregate each received processing results into a final result.

20. The non-transitory computer readable medium of claim 16, wherein each server cluster comprises an intelligent optimizer and a plurality of linked nodes operating collaboratively.

* * * * *